Aug. 10, 1954
S. T. WILLIAMS
2,685,906
RUNNING INFLATION AND DEFLATION SYSTEM
Filed Jan. 19, 1952
2 Sheets-Sheet 1
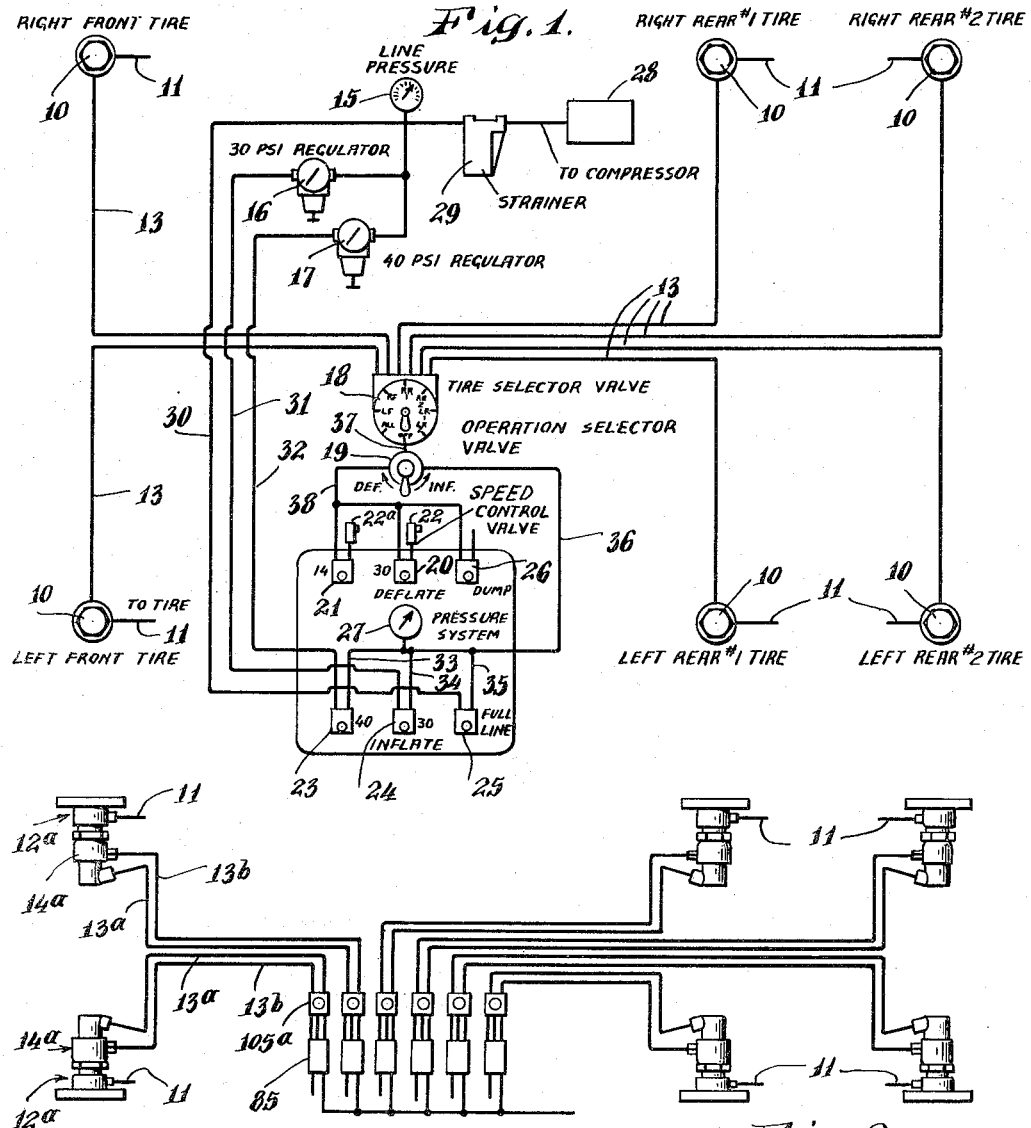
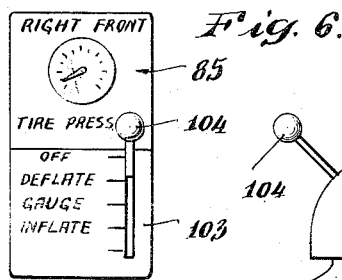
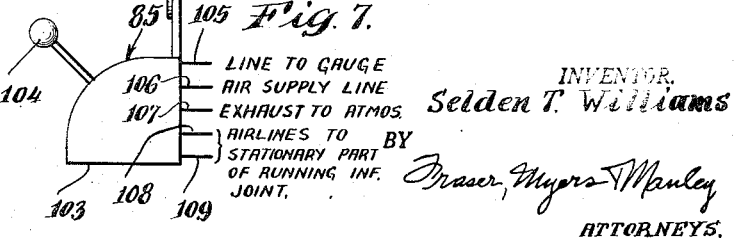
INVENTOR.
Selden T. Williams
BY
Fraser, Myers & Manley
ATTORNEYS.

Aug. 10, 1954  S. T. WILLIAMS  2,685,906
RUNNING INFLATION AND DEFLATION SYSTEM
Filed Jan. 19, 1952  2 Sheets-Sheet 2

INVENTOR.
Selden T. Williams
BY
Fraser, Myers & Manley
ATTORNEYS

Patented Aug. 10, 1954

2,685,906

UNITED STATES PATENT OFFICE 2,685,906

RUNNING INFLATION AND DEFLATION SYSTEM

Selden T. Williams, Bellerose, N. Y., assignor to Scovill Manufacturing Company, Waterbury, Conn., a corporation of Connecticut Application January 19, 1952, Serial No. 267,279

11 Claims. (Cl. 152—417)

My present invention relates to apparatus for effecting and controlling the inflation, deflation and gauging of pneumatic tires on a vehicle while the vehicle is in motion or at rest.

In the operation of a land-and-sea vehicle such as the army "Duck," different pressures are required in pneumatic tires for operation on different terrains. In the specific case of the "Duck" on a beach, the tire pressure should be reduced to 10 p. s. i.; on coral, 30 p. s. i. is desired; and at high speed on the normal highway a tire pressure of 40 p. s. i. is specified. On other vehicles the conditions may vary but the pattern is similar. Due to the nature and service of the vehicle it is often required that these changes in pressure take place while the vehicle is in motion.

Accordingly, the primary object of my present invention is to provide a system whereby the inflation, deflation and gauging of the tires on a vehicle from the operator's station on the vehicle can be accomplished while the vehicle is either at rest or in motion.

A further object is to provide a system of the character specified which will enable the operator to inflate, deflate or gauge each of the tires in any desired order of rotation or to accomplish such inflation or deflation of all the tires simultaneously.

A further object is to provide a rotating joint of novel and simple construction containing a normally closed check valve in the rotating unit of the joint, which valve can be opened by pneumatically controlled means from the operator's station on the vehicle.

A still further object is to provide a system of the character specified wherein the deflation of any one tire from any cause will not have any adverse effect on the pressure in any of the other tires.

The foregoing and other objects of my invention not specifically enumerated I accomplish by providing a special rotating joint containing a normally closed check valve and a chuck, which is pneumatically controlled by the pressure in the distribution system to unseat said valve, whereupon additional air may be charged into the tires or released therefrom so as to obtain the desired pressure in the tires. The invention will be readily understood by persons skilled in the art from a consideration of the detailed description which follows, when considered in connection with the accompanying drawings showing two embodiments of my invention, and wherein:

Figure 1 shows a schematic layout of one embodiment of my invention.

Fig. 2 shows a schematic layout of a second embodiment of my invention.

Figs. 6 and 7 show a front elevational view and a side elevational view, respectively, of the 5-way valve which is shown schematically in Fig. 2.

Figure 4:
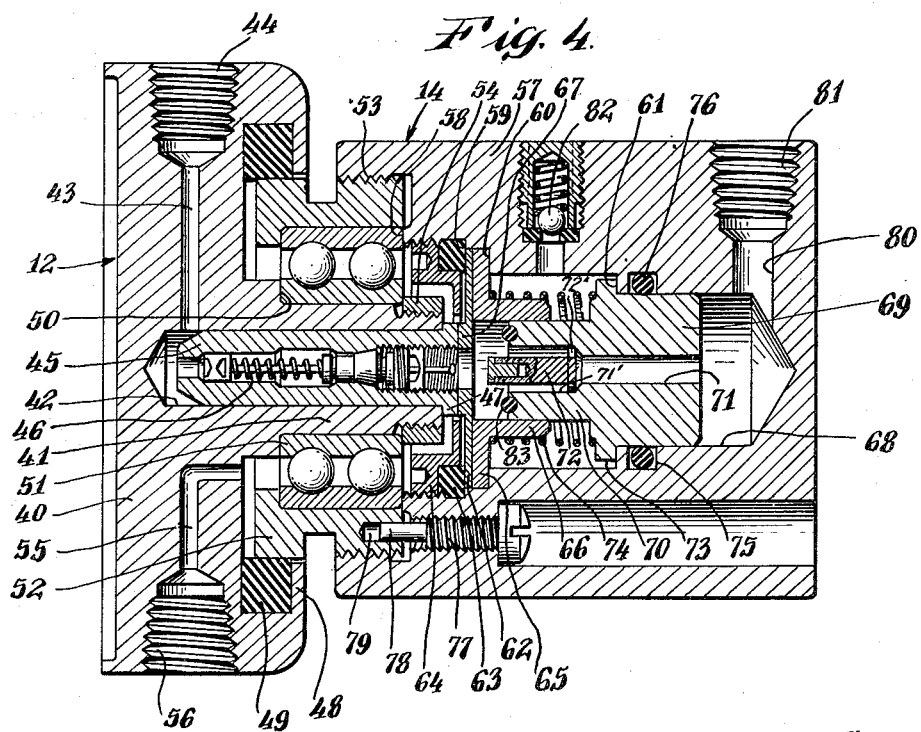
Fig. 4 shows a diametrical sectional view of the rotating joint used with the schematic layout of Fig. 1.
Figure 5:
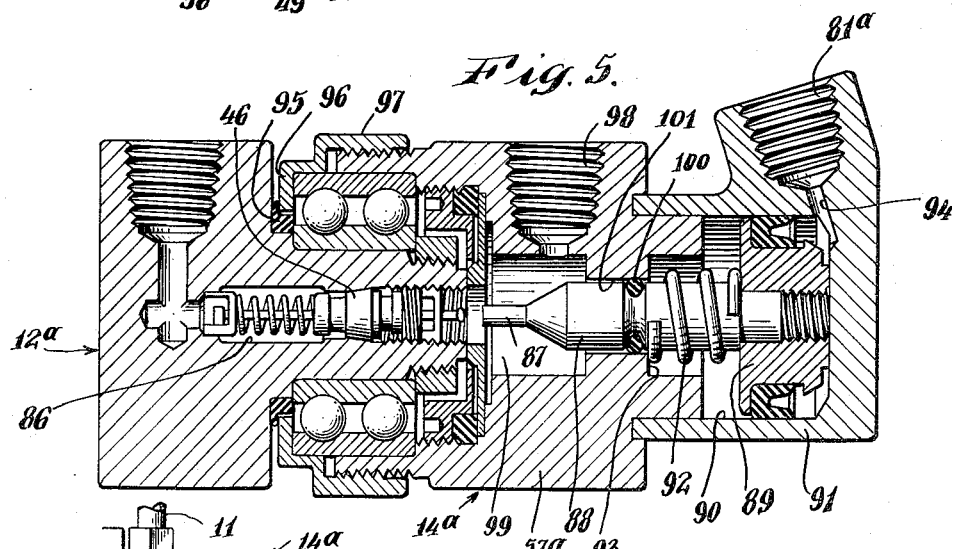
Fig. 5 shows a diametrical sectional view of the rotating joint used with the schematic layout of Fig. 2.

Referring first to Fig. 1 of the drawings, I have shown the running inflation and deflation system applied to a six-wheeled motor vehicle having two front wheels and four rear wheels, each provided with a rotating joint assembly 10 such as shown in enlarged section in Fig. 4. Each of the rotating joint assemblies has a conduit 11 extending from the rotating unit 12 to the pneumatic tire on the wheel (not shown) and a conduit 13 leading from the stationary unit 14 to a panel at the operator's station of the vehicle upon which panel is mounted a line pressure gauge 15, two pressure regulators 16 and 17, a tire selector valve 18, an operation selector valve 19, flow control valves 20, 21, 23, 24 and 25, two speed control valves 22 and 22a, a dump valve 26 and a system pressure gauge 27. A compressor reservoir 28 may supply air under pressure which flows through a strainer 29 and thence to the line pressure gauge 15 and pre-set pressure regulators 16 and 17. From the line pressure gauge 15 a conduit 30 leads to the full line flow control valve 25, while conduits 31 and 32 lead respectively from the pressure regulators 16 and 17 to the flow control valves 24 and 23, respectively. Leading from the flow control valves 23, 24 and 25 are branch ducts 33, 34 and 35, respectively, which connect with a conduit 36 which leads to one side of the operation selector valve 19, from which valve, in turn, two branch ducts 37 and 38 lead respectively to the tire selector valve 18 and to the flow control valves 20 and 21 and dump valve 26. The tire selector valve 18 connects with one end of each of the ducts 13 and is operative to establish fluid communication between the stationary unit 14 of each of the rotating joint assemblies and the tire selector valve. The various valves above enumerated may be of any preferred construction, hence detailed showings thereof have not been made.

Referring now to Fig. 4 of the drawings, the rotating joint assembly illustrated follows the general construction of the rotating joint disclosed in my prior United States Patent No. 2,107,405, dated February 8, 1938. However, since the rotating joint herein disclosed differs in certain material respects from that disclosed in my aforementioned patents, the construction of the rotating joint shown in Fig. 4 is hereinafter described in detail.

The rotating unit 12 of the rotating joint assembly is of generally cylindrical form and has a thickened end wall 40 and a reduced axial extension 41 provided with an axial blind bore 42 which, adjacent its blind end, communicates with a radial duct 43 which terminates in an enlarged screw-threaded socket 44 adapted to accommodate a coupling (not shown) by which the rotating unit is pneumatically connected to the interior of the tire on the wheel on which the rotating joint assembly is mounted. The rotating unit 12 may be mounted on the hub of a wheel in any preferred manner. Within the bore 42 is mounted a check valve unit consisting of a casing 45 having therein a conventional tire valve core or check valve 46, the outer end of the casing having an enlarged flange 47 which bears against the outer end of the axial extension 41. The thickened end wall 40 is formed with an inwardly directed peripheral flange 48 whereby an annular recess is provided within which is positioned a dust ring 49 formed of soft felt or other suitable material. The axial extension 41 forms with the thickened end wall a shoulder 50 and, upon said axial extension is mounted an annulus 51 containing ball bearings or other anti-friction means, the said annulus being contained within a bearing housing 52 which, at its inner end is of a diameter to snugly fit within and engage the dust ring 49. The bearing housing 52 at its outer end is screw-threaded to accommodate internal screw-threads 53 of the stationary unit 14. The anti-friction bearing annulus 51 is held upon the axial extension 41 by a nut 54 engaging a screw-thread formed on the outer end of said extension. To lubricate the ball bearing or anti-friction means, the chamber within which said anti-friction means are housed is adapted to receive lubricant through a communicating duct 55 which, at its outer end terminates in an enlarged, internally screw-threaded socket 56 into which a conventional lubricating fitting (not shown) is adapted to be connected.

The stationary unit 14 consists of a cap-like member 57 which may be fixedly connected to a part of the vehicle in any desired manner. The member 57, which may be termed a diaphragm housing, is formed with bores of progressively smaller diameters to provide a plurality of shoulders 58, 59, 60 and 61. Held against the shoulder 60 through an intermediary flexible diaphragm 62, a packing gasket 63 and an internal nut 64 is the flange 65 on a sleeve 66. The flexible diaphragm 62 has a thickened central portion 67 which is held in bearing contact with the outer end face of the flange 47 on the casing 45. The flexible diaphragm 62 is preferably formed of a hard, synthetic resin such as graphitized "Micarta" or analogous material and functions to provide a rotating, low friction seal with the end of the axial extension 41 of the rotating unit 12. Mounted for sliding engagement within the axial bore 68 of smallest diameter within the cap-like member 57 is a plunger or piston 69 having a reduced axial portion 70 which slidably fits within the bore of the sleeve 66. The piston 69 has an axial bore 71 formed with an enlarged portion 71' within which is force-fitted a spider 72' which carries a smaller diameter projecting valve unseating member or pin 72 to permit free passage of fluid through the piston 69. The piston 69 also has an annular flange 73 against which bears one end of a coil-spring 74, the other end of which bears against the flange 65, the spring urging the piston outwardly so as to hold the valve unseating member 72 out of engagement with the pin of the valve core 46. To provide a leak-tight sliding fit for the piston 69 within the bore 68, the cap-like member 57 is formed with an annular recess 75 within which is disposed an O-ring packing 76. To hold the screw-threaded connection between the cap-like member 57 on the bearing housing 52 against accidental loosening, a screw-threaded locking pin 77 carried by the member 57 has an end portion 78 which engages within a socket 79 in the bearing housing 52. Leading from the axial bore 68 is a duct 80 which terminates in an enlarged screw-threaded socket 81 adapted to accommodate a coupling from a hose line attached to the conduit 13. The cap-like member 57 is also provided with a relief or vent valve 82, the function for which will presently appear.

The operation of the embodiment of my invention shown in Figs. 1 and 4 is as follows:

Let it be assumed that it is desired to simultaneously inflate all of the tires on the vehicle to the same pressure, say 40 p. s. i., while the vehicle is either at rest or in motion. To accomplish this, the flow control valve 23 is opened, the operation selector valve 19 is turned to the right or inflating position and the operating handle on the tire selector valve 18 is turned to the index marked "all." When the controls have been set as described in the preceding sentence, air under pressure will flow from the compressor or reservoir 28 through the strainer 29 and thence through the various indicated valves to the bores 68 in each of the cap-like members 57 of the stationary units 14. Said air pressure acting upon the outer end of the piston 69 will move the same against the force of the spring 74 to a position where the valve unseating member 72 will engage and depress the pin of the valve core 46 to open said valve and simultaneously make a leak-tight seal between the inner end of the piston 69 and the flexible diaphragm 62 through the medium of the annular packing ring 83. Air will then flow from the source, through the various valves, through the axial bore 71 in the piston, then through the casing 45 and duct 43 into each of the tires. The pressure within said tires will be indicated on the system pressure gauge 27. When the tires have been inflated to the desired pressure, which will be determined by the pressure regulator 17, the control valve 23 is then manually closed and the air in the ducts 36 and 13 may be dumped to atmosphere by turning the handle of the operation selector valve to deflating position and opening the dump valve 26. The release of pressure from behind the pistons 69 will cause said pistons to move outwardly under the influence of springs 74 and the individual core valves 46 will close under the force of their springs and tire pressure. If, in lieu of inflating all the valves simultaneously, it is desired to add air to any one of the tires, the same procedure would be followed except that the operating handle of the tire selector valve 18 would be set to the particular tire to which air is to be charged.

Assuming now that the tires are inflated at 40 p. s. i. and it is desired to reduce the pressures in all of the tires to 30 p. s. i.; the operator will move the handle of the operation selector valve 19 to inflating position and the handle of the tire selector valve 18 to the "all" position, then will open pressure control valve 23, 24 or 25 for an instant. When this is done, each of the valves of the cores 46 will be unseated by movement of the pistons 69 and will be held unseated by virtue of the fact that the 30 p. s. i., 40 p. s. i. or line pressure acting on the outer end of the piston 69 will exert a greater overall force on said piston than will the back pressure of 40 pounds per square inch from the tire acting upon the reduced area at the inner end of the piston. The operation selector valve 19 is then turned to deflating position and the flow control valve 20 is then opened, thus permitting the air from within the tires to pass through the speed control valve 22 which will limit the deflation to 30 pounds in each tire. When such reduced pressure is obtained in each of the tires, the valve 20 is then closed and the dump valve 26 is opened to relieve the pressure acting on the large end of each piston, whereupon the springs 74 will move the pistons and permit the core valves 46 to close. Any air under pressure trapped in the area surrounding the piston will escape through the relief valve 82. Here again, if desired, the pressure in any one of the tires may be controlled or the pressures in the various tires sequentially controlled by operation of the tire selector valve.

It will thus be apparent that all of the tires may be inflated or deflated at once or that the pressure may be equalized between the several vehicle tires by proper manipulation of the various valves. It will also be apparent that the pressure may be individually checked in any of the tires by manipulation of the proper valves.

Figure 3:
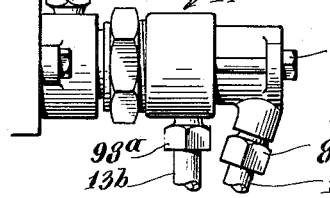
Fig. 3 shows a side elevational view of the rotating joint used with the schematic layout of Fig. 2.

Referring now to Figs. 2, 3, 5, 6 and 7 of the drawings wherein I have shown a second embodiment of my invention, the stationary unit 14a of each of the rotating joint assemblies has two air lines 13a and 13b connected thereto and leading from 5-way control valves 85 shown more in detail in Figs. 6 and 7. In this embodiment the rotating unit 12a has a blind axial bore 86 within which is mounted a valve core 46, the pin of which is adapted to be unseated by a valve unseating member or pin 87 carried by a plunger 88 attached to a piston 89 movable within the bore 90 of a cylinder 91 forming part of the stationary unit 14a. The piston 89 is normally held outwardly by a coil-spring 92, one end of which bears against the rear face of the piston and the other end bears against a shoulder 93 within a cap-shaped member 57a. A duct 94 leads from the interior of the cylinder 91 to an enlarged internally threaded socket 81a adapted to accommodate a coupling 81b (Fig. 3) attached to the conduit 13a. The rotatable leak-tight connection between the rotating unit 12a and the stationary unit 14a is substantially the same as that disclosed and described in relation to Fig. 4. However, in lieu of the packing ring 49 shown in Fig. 4, in the present embodiment there is provided a packing ring 95 with which frictional engagement is made by a flange 96 on a bearing housing member 97. Each stationary cap-like member 57a is formed with a screw-threaded socket 98 adapted to accommodate a coupling 98a (Fig. 3) attached to the conduit 13b, the inner end of the socket 98 communicating with a chamber 99, which, in turn, communicates with the axial bore 86. To prevent pressure from within the chamber 99 acting upon the rear face of the piston 89, the plunger 88 is provided with an O-ring packing 100 having a leak-tight sliding fit in a bore 101 in the member 57a. The cylinder 91 may be fixedly held to the member 57a in any desired manner, herein shown by bolts 102 (Fig. 3).

The control valves 85 may be of any preferred construction, and, as herein shown, each in the form of a casing 103 within which is a movable valve (not shown) operable by a control handle 104, said movable valve being adapted to establish communication with five tap-offs from the casing. Tap-off 105 leads to a pressure gauge 105a, 106 communicates with the line supply line, 107 leads to atmosphere, and 108 and 109 connect respectively with the conduits 13a and 13b. A small air cylinder (not shown) is relied upon to service the air pressure to the piston 89 in cylinder 91.

The operation of the embodiment shown in Figs. 2, 3, 5, 6 and 7, is as follows:

Air under pressure from an independent source is first admitted to the cylinder 91 through conduit 13a, then depending upon whether it is desired to inflate the tire to any particular pressure, to vent air therefrom, or to determine the pressure therein, the operating handle 104 is moved to the inflate, deflate, or gauge position (Fig. 6). The air under pressure admitted to cylinder 91 will act upon the piston 89 to move it against the force of the spring 92 to open the valve core 46. As the aforementioned air is admitted into conduit 13a, the air in the tire is instantaneously connected through chamber 99 and conduit 13b with the air supply line 106, the exhaust line to the atmosphere 107, or the line to the gauge 105, depending upon the setting of operating handle 104. When it is desired to close valve core 46, operating handle 104 is moved to the off position, and the air which was in conduit 13a is exhausted to atmosphere, thus allowing spring 92 to return piston 89 to its at-rest position, allowing valve unseating member 87 to break contact with pin of valve core 46. By mounting the 5-way valves 85 en banc on a panel at the operator's station of the vehicle, it will be appreciated that any or all of the tires may be inflated, deflated or gauged while the vehicle is at rest or in motion.

While I have shown and described two preferred embodiments of my invention, it is to be understood that primarily the invention is directed to the novel rotating joint connection that carries a piston operated valve unseating member adapted to open a tire valve core which is preferably mounted within an axial bore in one of the rotating joint assembly units. Accordingly, I do not wish to be limited to the precise disclosures as herein contained since they may be varied within the scope of engineering and mechanical skill, without departing from the spirit of the invention as hereinafter claimed.

What I claim is:

1. In combination with a vehicle, a wheel comprising two coaxial, relatively rotatable units having coaxial communicating passages, the passage in each unit communicating with a source or reservoir for fluid under pressure, a normally closed check valve in the passage in one of said units, a coaxially movable valve unseating member in the coaxial communicating passage in the other of said units, means normally holding said unseating member out of valve unseating position, and means for moving said valve unseating member, controlled from the operator's station of the vehicle, for unseating the check valve.

2. In combination with a vehicle, a wheel comprising two coaxial, relatively rotatable units having coaxial communicating passages, the passage in each unit communicating with a source or reservoir for fluid under pressure, a normally closed check valve axially disposed in one of said units, a movable valve unseating member in the coaxial communicating passage in the other of said units, means normally holding said unseating member out of valve unseating position, means for moving said valve unseating member from the operator's station of the vehicle for unseating the check valve, a fluid-communicating duct between a source of fluid under pressure and the axial passage within which the valve-unseating member is movable and means operable from the operator's station of the vehicle for controlling the fluid in said fluid-communicating duct.

3. A device of the character described, comprising two axially aligned, relatively rotatable units having coaxial fluid-communicating passages, means providing a rotatable leak-tight connection between said units, the passage in each unit communicating with a source of reservoir for fluid under pressure, a normally closed check valve in one of said units, a movable valve unseating member in the axial passage in the other of said units; and means in said last mentioned passage responsive to fluid pressure from the source to which said passage is connected for unseating the check valve.

4. A device according to claim 3 wherein a spring normally biases the valve unseating member to hold it out of valve unseating position.

5. A device of the character described, comprising two axially aligned, relatively rotatable units having coaxial fluid communicating passages, means providing a rotatable leak-tight connection between said units, the passage in each unit communicating with a source or reservoir for fluid under pressure, one of said units being rotatable and the other of said units being stationary, a normally closed check valve in the rotatable unit, a movable valve unseating member in the axial passage of the stationary unit, and means in said stationary unit passage responsive to fluid pressure from the source to which said passage is connected for unseating the check valve.

6. In combination, a vehicle wheel having a pneumatic tire, an assembly for controlling the pressure within the tire mounted on the wheel, said assembly comprising a first unit which is rotatable with the wheel and a second unit which is stationary and coaxial with the first unit, a fluid-communicating passage between said assembly and the tire with a part of said passage extending axially through the rotatable connection between the units, a normally closed valve in the axial part of the passage in the first unit controlling the pressure of fluid in the tire, a valve unseating means axially movable in the axial part of the passage in the second unit, said valve unseating member being spring-biased out of contact with the valve and responsive to fluid pressure acting thereon in a direction opposite to the seating of the check valve for unseating said valve.

7. The combination according to claim 6 wherein the valve unseating means comprises a plunger movable within the passage in the second unit.

8. The combination according to claim 6 wherein the valve unseating means comprises a plunger movable within the passage in the second unit and said plunger has a fluid passage therethrough.

9. The combination according to claim 6 wherein the valve unseating means comprises a plunger movable within the passage in the second unit and a valve unseating pin carried by the plunger and a conduit leading from the axial passage in the second unit within which the valve unseating pin is movable.

10. In combination, a vehicle wheel having a pneumatic tire, an assembly detachably mounted on said wheel for controlling the pressure of fluid in said tire, said assembly comprising a first unit rotatable with the wheel and having a first chamber in open communication with said tire, a second chamber in which the pressure may be varied and a valve member in the second chamber for controlling communication between said chambers, a stationary second unit in axial alignment with the first unit and providing a leak-tight connection therewith, said second unit having a first chamber in open communication with the second chamber in the first unit, a second chamber having communication with a source of fluid under pressure, a piston movable in said second chamber, said piston carrying a valve unseating means movable in the first chamber, spring means biasing said piston to normally hold the valve unseating means out of engagement with the valve in the first unit and being responsive to fluid pressure from the last-mentioned source to move the piston and the valve unseating means to unseat the valve in the first unit and establish fluid communication between the tire and the first chamber of the second unit.

11. The combination according to claim 10 wherein the first chamber in the second unit has communication with a source of fluid pressure independent of the fluid pressure source which is adapted to act upon the piston to move the valve unseating means to unseat the valve.

References Cited in the file of this patent

UNITED STATES PATENTS

| Number | Name | Date |
|---|---|---|
| 2,107,405 | Williams | Feb. 8, 1938 |
| 2,242,207 | Bowers | May 20, 1941 |
| 2,452,527 | Peter | Oct. 26, 1948 |
| 2,633,889 | Vignini | Apr. 7, 1953 |